United States Patent [19]

Long

[11] Patent Number: 5,385,509
[45] Date of Patent: Jan. 31, 1995

[54] GEAR TRANSMISSION WITH RATCHET O.W.C. AND PLANETARY GEAR SET SUITABLE FOR PROVIDING A PULSED DRIVE

[75] Inventor: John D. Long, Claremont, Canada

[73] Assignee: Longford Equipment International Limited, Scarborough, Canada

[21] Appl. No.: 93,624

[22] Filed: Jul. 20, 1993

[51] Int. Cl.⁶ .................. F16H 29/04; F16H 33/08
[52] U.S. Cl. .................. 475/14; 475/339; 74/84 R; 74/117; 74/125.5
[58] Field of Search ........... 74/52, 84 R, 116, 118, 74/125.5, 117; 475/14, 339

[56] References Cited

U.S. PATENT DOCUMENTS

| | | | |
|---|---|---|---|
| 208,325 | 9/1878 | Meyers | 74/118 |
| 261,760 | 7/1882 | Porter | 74/118 |
| 316,089 | 4/1885 | Weston | 74/116 |
| 383,054 | 5/1888 | Huson | 74/117 |
| 457,307 | 8/1891 | Davis | 74/116 |
| 748,024 | 12/1903 | Stevens | 74/118 |
| 861,723 | 7/1907 | Hansen | 74/117 |
| 1,284,212 | 11/1918 | Barber | 74/117 |
| 1,341,627 | 6/1920 | Barber | 74/117 |
| 1,607,223 | 11/1926 | Wilcox et al. | 74/117 |
| 1,896,732 | 2/1933 | Stone | 74/116 |
| 2,192,016 | 2/1940 | Petitjean | 74/117 |
| 2,389,929 | 11/1945 | Paulsen | 74/117 |
| 2,504,623 | 4/1950 | Barker | 74/117 |
| 2,891,405 | 6/1959 | Elmore | 74/84 |
| 3,256,758 | 6/1966 | Medesha | 74/125.5 |
| 5,221,237 | 6/1993 | Weber | 475/14 |

FOREIGN PATENT DOCUMENTS

| | | | |
|---|---|---|---|
| 1084541 | 6/1960 | Germany | 475/14 |
| 102847 | 6/1983 | Japan | 475/14 |
| 1295107 | 3/1987 | U.S.S.R. | 74/117 |
| 1696801 | 12/1991 | U.S.S.R. | 475/339 |

*Primary Examiner*—Dirk Wright
*Assistant Examiner*—Khoi Q. Ta

[57] ABSTRACT

A drive train for a pulsed feed wheel has an offset cam on a continuously rotating drive shaft. The cam acts against a pendulum which rocks the input of a one-way clutch. A support arm attached to the output of the clutch terminates in a planetary gear. The planetary gear meshes with two sun gears one of which is fixed against rotation and the other of which is keyed to the output shaft. The planetary gear and sun gears are harmonic gears. Each revolution of the drive shaft pulses the output shaft through a small fraction of one revolution.

6 Claims, 3 Drawing Sheets

GEAR TRANSMISSION WITH RATCHET O.W.C. AND PLANETARY GEAR SET SUITABLE FOR PROVIDING A PULSED DRIVE

BACKGROUND OF THE INVENTION

1. Field of the Invention

This invention relates to a gear transmission and a drive train containing such a gear transmission.

2. Description of the Related Art

U.S. Pat. No. 4,651,983 issued Mar. 24, 1987 to John A. Long discloses a drive for a pulsed feed wheel in a card feeder. When a card output by the feeder interrupts a sensor, a pulse counter is activated in order to send a selected number of pulses to a stepping motor which, in turn, drives the feed wheel through a preselected arc. This electrically controlled pulsed feed wheel is a relatively expensive component of the card feeder control. It would be preferable to have an alternate less expensive manner of pulsing a feed wheel.

SUMMARY OF THE INVENTION

According to the present invention, there is provided a gear transmission comprising: a one-way clutch having an input member and an output member and a clutch axis; a pendulum depending from said input member for rocking about said clutch axis, said pendulum terminating in an input end; a support arm depending from the output member of said one-way clutch; a planetary gear rotatably supported by said support arm about an axis aligned with said clutch axis; a fixed sun gear and a co-axial rotatable output sun gear in meshing relation with said planetary gear, said rotatable sun gear and said fixed sun gear having a different number of teeth such that said planetary gear and said fixed and rotatable sun gears act as harmonic gears.

BRIEF DESCRIPTION OF THE DRAWINGS

In the figures which disclose example embodiments of the invention.

DESCRIPTION OF THE PREFERRED EMBODIMENTS

Figure 1:
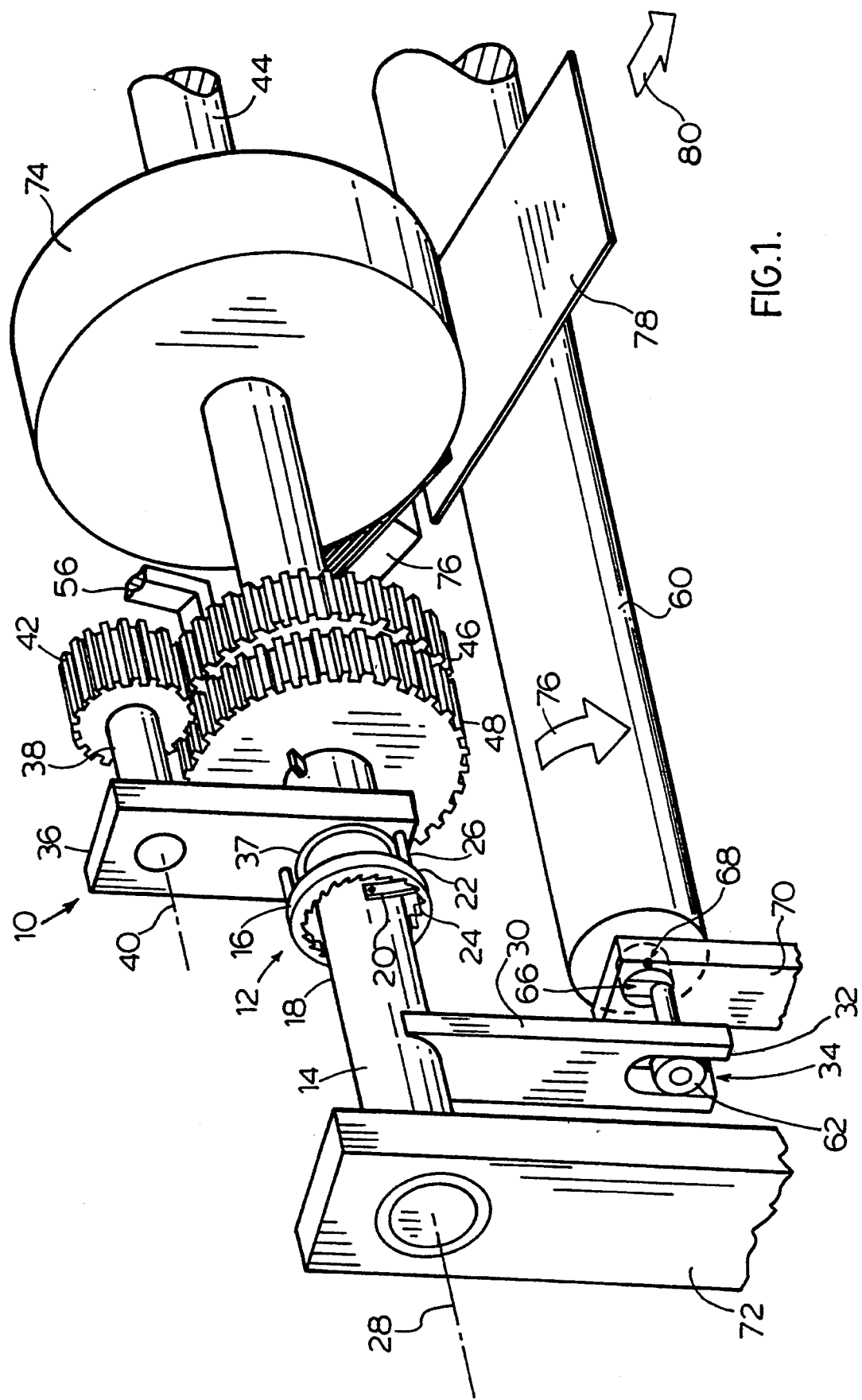
FIG. 1 is perspective view of a drive train for a pulsed feed wheel including the gear transmission of this invention.

With reference to the figures, gear transmission 10 comprises a one-way clutch 12 having an input member 14 and an output member 16. Input member 14 comprises clutch shaft 18 to which a spring finger 20 is attached; output member 16 comprises ring 22 with interiorly directed teeth 24 and support posts 26 which extend from the side of the ring. The axis of the clutch is indicated at 28. A pendulum 30 depends from the input member 14 of the clutch and terminates in an input end 32 with a slot 34. Because the pendulum depends from the input member of clutch 12, it rocks about the axis 28 of the clutch.

A support arm 36 is supported by sleeve bearing 37 on clutch shaft 14 and is affixed to support posts 26 so that it depends from the output member 16 of the clutch. Arm 36 terminates in a shaft 38 with an axis 40 aligned with clutch axis 28.

Figure 2:
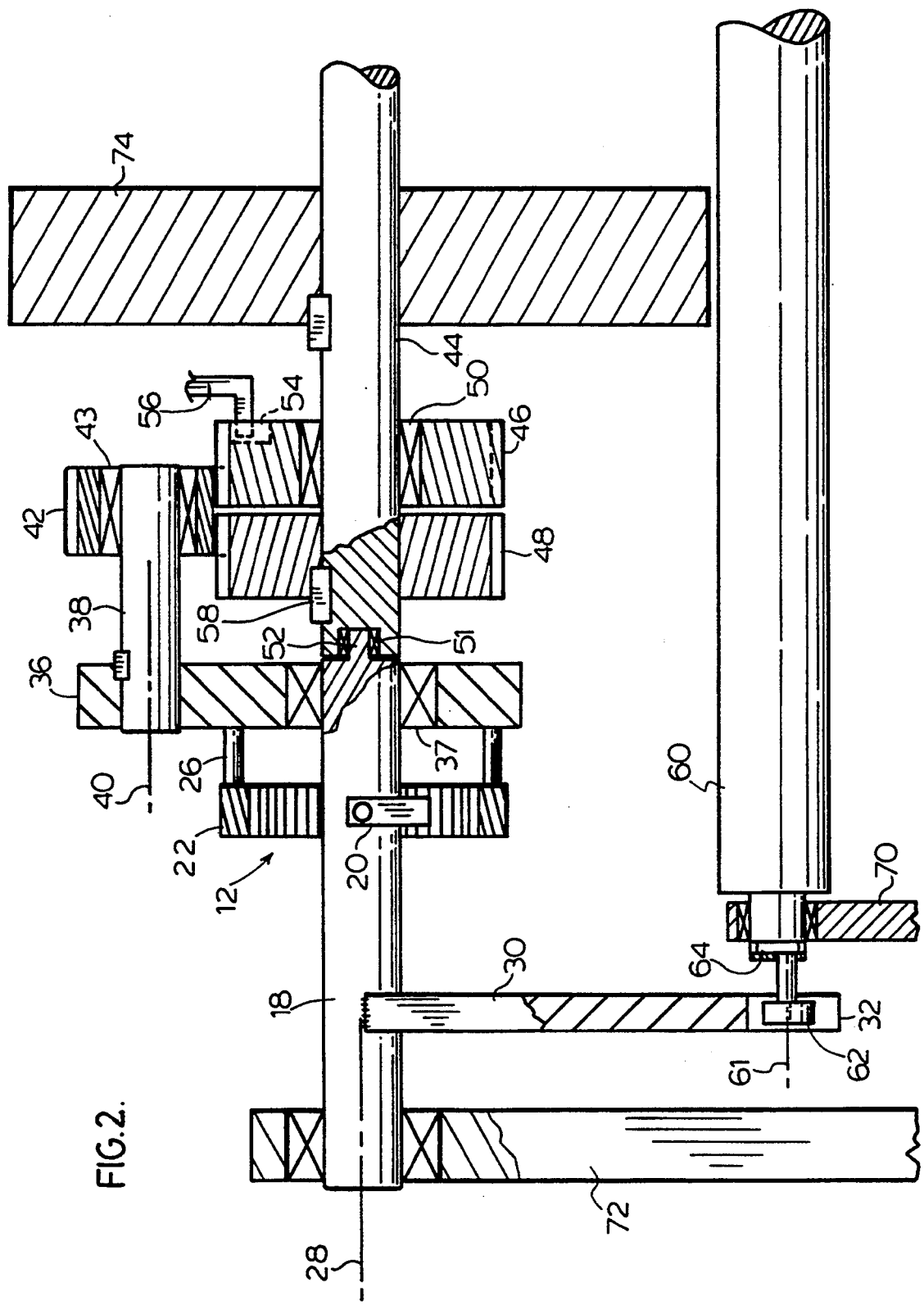
FIG. 2 is a partially cross-sectional view of FIG. 1.

With specific reference to FIG. 2, shaft 38 rotatably supports planetary spur gear 42 on sleeve bearing 43. The planetary gear 42 meshes with sun gears 46 and 48 which are supported on an output shaft 44 axially aligned with axis 28 of the clutch 12. A sleeve bearing 50 is interposed between output shaft 44 and sun gear 46 and sun gear 46 has an elongated slot 54 which receives an anchor pin 56. Thus, sun gear 46 is fixed against rotation. Sun gear 48 is keyed by key 58 to the output shaft 44 so that the shaft 44 rotates with sun gear 48. Output shaft 44 terminates in a well which receives a sleeve bearing 51 and a stub end 52 of clutch shaft 18. The interconnection of output shaft 44 and clutch shaft 18 therefore permits the output shaft to rotate independently of clutch shaft 18 while the clutch shaft provides axial support for the output shaft.

Fixed sun gear 46 has a slightly different number of teeth than does rotatable sun gear 48. For example, the fixed gear 46 may have fifty-one teeth and rotatable gear 48 may have fifty teeth. Accordingly, planetary gear 42, and sun gears 46, 48 are set up as harmonic gears.

A drive shaft 60 has a rotational axis 61 aligned with clutch axis 28. A cam is mounted on a plate 64 (FIG. 2) which is received by slot 66 (FIG. 1) in the end of the drive shaft and held in place by set screw 68 (FIG. 1). By virtue of this arrangement, the cam may be positioned eccentrically of the rotational axis 61 of the drive shaft and the eccentricity of the cam may be adjusted. The cam is received in slot 34 of pendulum 30.

Figure 3:
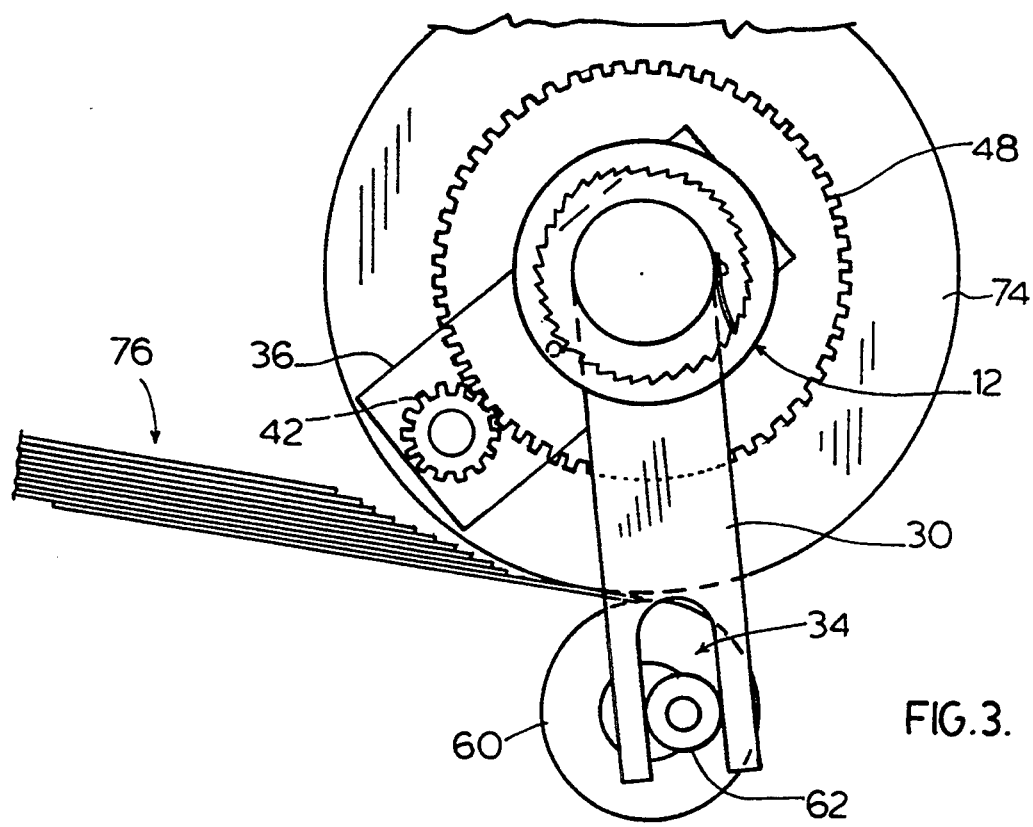
FIG. 3 is a partially broken away end view of FIG. 1, and FIG. 4 plan view of FIG. 1.
Figure 4:
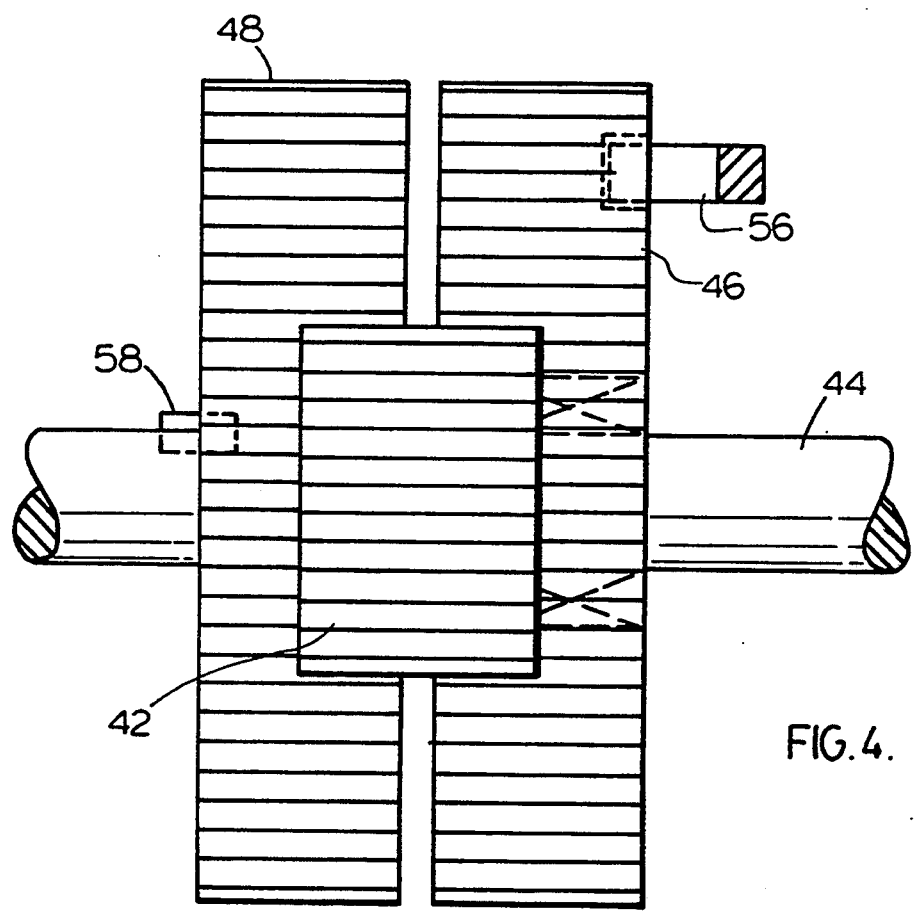

Output shaft 44 is keyed to a feed wheel 74. A stack of cards 76 (FIGS. 1 and 3) is supported adjacent an input side of the feed wheel. One end of drive shaft 60 is supported by post 70 and one end of the clutch shaft is supported by post 72.

In operation, when drive shaft 60 moves through one revolution in a clockwise direction as illustrated by arrow 76 in FIG. 1, eccentric cam 62 rocks the pendulum 30 back and forth through one cycle. Since pendulum 30 is joined to the input member 14 of one-way clutch 12, this input member 14 rotates alternately in a clockwise sense and then in a counterclockwise sense as the pendulum progresses through its cycle. Due to the orientation of teeth 24 and spring finger 20, the spring finger will ride over teeth 24 when clutch input member 14 rotates in a counterclockwise sense but will lock to one of the teeth 24 when the input member rotates in a clockwise sense. Accordingly, the input and output members of the clutch lock together when the pendulum rocks in the clockwise sense. Consequently, since support arm 36 depends from the output member of the clutch, the arm 36 rotates in this clockwise direction through an arc which is determined by the eccentricity of cam 62.

Planetary gear 42 moves with support arm 36 and meshes with sun gears 46, 48. Since the fixed sun gear 46 and the rotatable sun gear 48 have a different number of teeth, as the planetary gear moves through an arc about the sun gears, the rotatable gear 48 is caused to rotate through a small part of a revolution. For example, if fixed sun gear 46 has fifty teeth and rotatable sun gear 48 has forty-nine teeth, the rotatable gear will move through approximately one-fiftieth of a revolution each time planetary gear 42 completes one orbit about the sun gears. This operation of these harmonic gears will be well understood to those skilled in the art.

The clockwise progression of planetary gear 42 drives rotatable sun gear 46, and therefore the output shaft and the feed wheel 74. It will be appreciated by those skilled in the art that with the fixed sun gear having slightly more teeth than the rotatable sun gear, the rotatable sun gear 48, and therefore the feed wheel 74, is driven in a counterclockwise direction. Also, with drive shaft 60 rotating continuously, it will be appreciated that output shaft 44 (and therefore feed wheel 74) is pulsed. In other words, each time shaft 60 moves through one revolution, output shaft 44 is only moved during half of this revolution and is stationary during the other half of the revolution. It will be understood that the gear transmission 10 results in output shaft 44 revolving at a much slower rate than drive shaft 60. This ratio may be on the order of 3,000 to one (that is, three thousand revolutions of shaft 60 are required for output shaft 44 to move through one revolution).

Each time the feed wheel 74 is pulsed, it may feed a card 78 from the stack of cards 76 to the continuously rotating drive shaft in order to feed the card in a downstream direction illustrated by the arrow 80 in FIG. 1. The end supports for output shaft 44 and clutch shaft 18 may permit feed wheel 74 to move away from drive shaft 60 as thick card stock is fed between the shaft 60 and the feed wheel 74. Elongated slot 54 provides the necessary transverse freedom for the fixed sun gear in such instance.

The offset of the cam 62 may be adjusted by loosening set screw 68 and sliding plate 64 within slot 66. By adjusting the eccentricity of the cam, the length of the arc through which planetary gear 42 moves during each revolution of drive shaft 60 may be adjusted. This, therefore, serves as an adjustment in the gear ratio between drive shaft 60 and output shaft 44. Furthermore, the range of gear ratios available may be changed by choosing sun gears 46, 48 with a selected number of teeth.

It will be apparent to those skilled in the art that when drive shaft 60 is stopped, the harmonic gears 42, 46, and 48 act as a brake which holds shaft 44 from rotating.

For some applications, it may be desired to pulse the feed wheel 74 in a clockwise direction. This may be accomplished by simply choosing a rotatable sun gear 48 with slightly more teeth than the fixed sun gear 46. Thus, by selecting which of the rotatable and fixed sun gears has the greater number of teeth, the rotatable sun gear will rotate either in the same sense as the direction of orbit of the planetary gear 42 or in an opposite sense to the direction of orbit of the planetary gear. Of course, for any given fixed and rotatable sun gears 46, 48, by designing the gear transmission of this invention to extend from the opposite end of drive shaft 60, the direction of rotation of feed wheel 74 would also be reversed.

For some applications it may be desired to rotate feed wheel 74 continuously, albeit at a much lower r.p.m. than drive shaft 60. This may be accomplished by employing a second gear transmission similar to gear transmission 10 but modified so that it extends from the opposite ends of drive shaft 60 and output shaft 44 to that of gear transmission 10. The one-way clutch of this modified gear transmission would then engage in a counterclockwise direction and free-wheel in a clockwise direction while the one-way clutch 12 of gear transmission 10 would engage in a clockwise direction. Therefore, during one-half of a revolution of the drive shaft 60, gear transmission 10 would rotate feed wheel 74 and during the other half of a revolution of the drive shaft, the modified gear transmission would rotate the feed wheel.

Other modifications will be apparent to those skilled in the art and, accordingly, the invention is defined to the claims.

What is claimed is:

1. A gear transmission comprising:
   a one-way clutch having an input member and an output member and a clutch axis;
   a pendulum mounted to said input member for rocking about said clutch axis, said pendulum terminating in an input end;
   a support arm mounted to the output member of said one-way clutch;
   a planetary gear rotatably supported by said support arm about an axis aligned with said clutch axis;
   a fixed sun gear and a co-axial rotatable output sun gear in meshing relation with said planetary gear, said rotatable sun gear and said fixed sun gear having a different number of teeth such that for every orbit of said planetary gear, said rotatable sun gear rotates a fraction of a revolution.

2. The gear transmission of claim 1 wherein said pendulum has a cam receiving slot in said input end.

3. The gear transmission of claim 1 wherein said planetary gear and said fixed and rotatable sun gears are spur gears.

4. A drive train comprising:
   a drive shaft having a rotational axis, said drive shaft terminating in a cam offset from said drive shaft axis;
   a one-way clutch having an input member and an output member and a clutch axis aligned with said drive shaft axis;
   a pendulum mounted to said input member for rocking about said clutch axis, said pendulum having a slot receiving said cam;
   a support arm mounted to the output member of said one-way clutch;
   a planetary gear rotatably supported by said support arm about an axis aligned with said clutch axis;
   a fixed sun gear and a co-axial rotatable sun gear in meshing relation with said planetary gear, said rotatable sun gear and said fixed sun gear having a different number of teeth; and
   an output driven shaft co-axially mounted to said rotatable sun gear for rotation therewith such that for every orbit of said planetary gear, said rotatable sun gear rotates a fraction of a revolution.

5. The drive train of claim 4 including means to adjust the offset of said cam from said drive shaft axis.

6. A gear transmission suitable for providing a pulsed drive comprising:
   a one-way clutch having an input member and an output member and a clutch axis;
   a pendulum mounted to said input member for rocking about said clutch axis, said pendulum terminating in an input end;
   a support arm mounted to the output member of said one-way clutch;
   a planetary gear rotatably supported by said support arm about an axis aligned with said clutch axis;
   a fixed sun gear and a co-axial rotatable output sun gear in meshing relation with said planetary gear, said rotatable sun gear and said fixed sun gear having a different number of teeth such that for every orbit of said planetary gear, said rotatable sun gear rotates a fraction of a revolution.

* * * * *